(12) United States Patent
Evans et al.

(10) Patent No.: US 7,266,543 B2
(45) Date of Patent: Sep. 4, 2007

(54) SYSTEM AND METHOD FOR ACCESSING RESOURCES IN A DATABASE

(75) Inventors: Dominique J. Evans, North York (CA); Mario S. Godinez, Toronto (CA); Joseph Serge Limoges, Etobicoke (CA)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 10/425,750

(22) Filed: Apr. 29, 2003

(65) Prior Publication Data
US 2004/0205054 A1    Oct. 14, 2004

(30) Foreign Application Priority Data
Apr. 8, 2003    (CA)    ................................. 2425048

(51) Int. Cl.
*G06F 17/30*    (2006.01)
(52) U.S. Cl. ........................... 707/2; 707/102; 709/227
(58) Field of Classification Search .................... 707/2, 707/1, 204, 9, 10, 102, 8, 200, 203; 709/201, 709/240, 225, 203, 227; 719/227, 311, 315
See application file for complete search history.

(56) References Cited

U.S. PATENT DOCUMENTS

| | | | |
|---|---|---|---|
| 6,026,394 A | 2/2000 | Tsuchida et al. | |
| 6,112,196 A * | 8/2000 | Zimowski et al. ............. | 707/2 |
| 6,182,154 B1 | 1/2001 | Campagnoni et al. ...... | 709/315 |
| 6,339,771 B1 * | 1/2002 | Zimowski et al. ............. | 707/2 |
| 6,356,930 B2 | 3/2002 | Garg .......................... | 709/201 |
| 6,359,889 B1 | 3/2002 | Tazaki et al. ................ | 370/395 |
| 6,496,833 B1 | 12/2002 | Goldberg et al. | |
| 6,859,834 B1 * | 2/2005 | Arora et al. ................. | 709/227 |
| 2001/0054065 A1 | 12/2001 | Garg ........................... | 709/203 |
| 2002/0019872 A1 | 2/2002 | Ferwerda et al. ........... | 709/225 |
| 2003/0046298 A1 * | 3/2003 | Weedon ...................... | 707/102 |
| 2003/0220941 A1 * | 11/2003 | Arnold et al. .............. | 707/200 |
| 2004/0123048 A1 * | 6/2004 | Mullins et al. ............. | 711/141 |

FOREIGN PATENT DOCUMENTS

| | | |
|---|---|---|
| CA | 2425048 | 2/2007 |
| WO | WO00113327 A1 | 2/2001 |
| WO | WO 02/10917 A1 | 2/2002 |

OTHER PUBLICATIONS

Gao Lu et al., "The Design for Ethernet Access Concentrator," Conference E, 2001, International Conference on Info-tech and Info-net Proceedings, 0ct. 29-Nov. 1, 2001, pp. 223-228.
Armando Fox et al., "Adapting to Network and Client Variability Via On-Demand Dynamic Distillation," ASPLOS VII Oct. 1996 MA, USA, 1996.

* cited by examiner

*Primary Examiner*—Shahid Alam
*Assistant Examiner*—Rezwanul Mahmood
(74) *Attorney, Agent, or Firm*—Kunzler & McKenzie

(57) ABSTRACT

A method and database management system for connecting to a database involves reusing connections for operations performed in sequence, rather than creating independent connections for each requested client connection. An application server, or layer, receives the requests and parses them to identify modes of operation. Separate connections are created to support each mode of operation so that the database receives the operations and requests in a format that is sorted by type, at a rate that can be adjusted to match capacity of the database.

15 Claims, 4 Drawing Sheets

SYSTEM AND METHOD FOR ACCESSING RESOURCES IN A DATABASE

PRIORITY CLAIM

The present application claims the priority of Canadian patent application, Ser. No. 2425048, titled "Method And System For Resource Access," which was filed on Apr. 8, 2003 with the Canadian Patent Office, by Dominique J. Evans, Mario S. Godinez, and Joseph Serge Limoges, and which is incorporated herein by reference.

FIELD OF THE INVENTION

The present invention generally relates to transaction distribution systems, and in particular to a database transaction distribution system for accessing resources in a database.

BACKGROUND OF THE INVENTION

Databases are used to store and provide access to a large proportion of digital information. As current databases have capacity to store large volumes of data and provide many thousands of users with access to the digital information, they have been widely deployed by large and mid-sized businesses. The integrity of the digital information in a database is paramount.

Systems for providing access to the digital information contained in a database are known in the art. Many of these database access systems comprise an application server associated with the database through which a set of clients may access the database. The application server may perform numerous operations including controlling access to the database to prevent clients from performing unauthorized actions, converting client data into a format and protocol used for accessing the database, and sequencing the database requests.

Application servers relay client requests to the database via database connections without any regard for the operations they may contain. The application servers receive the database requests from the client side of the application server and provide for the processing of the database requests. Processing the database requests involves one or more database connections. The setup and tear-down of connections involves connection control processing and signaling for each of the database connections. As there are many of these database connections concurrently maintained at the database, significant processing and transmission resources are occupied at the database, the application server, and the communications equipment extending therebetween.

While the signaling and processing of the connection setup and release is a load that degrades the performance of the application server and the communications equipment, these penalties can be mitigated relatively inexpensively by adding or upgrading application servers and increasing capacity of data network 18 as required. However, the penalty incurred at the database that receives, processes and generates one side of the connection setup and release signaling is not likewise overcome by duplication. It is not possible to duplicate the digital information of the database for access purposes without sacrificing consistency and integrity of the digital information. Duplication of the digital information leads to intractable problems with keeping the copies of the digital information consistent. Thus an inherent bottleneck exists where the modifications to the digital information takes place.

Accordingly, there is a need for a DBMS that reduces a connection control workload of a resource base, particularly if it provides for a more efficient use of resource base connections to reduce the number of connections to the resource base. Further a method of delivering resource requests in a sorted format to a resource base is needed. The need for such a system has heretofore been unsatisfied.

SUMMARY OF THE INVENTION

The present invention satisfies this need, and presents a system, a computer program product, and associated method (collectively referred to herein as "the system" or "the present system") for providing a DBMS that reduces a connection control workload associated with a database and concentrates resource requests onto connections between an application server and a database.

The present system provides for the reuse of connections for a sequence of database management operations that are serially exchanged with the database. This reduces the connection control processing and signaling load that may be experienced by the DBMS, as well as at the application server.

Further, in accordance with embodiments of the present system, properties of the queries can be used to improve efficiency of the DBMS. In particular, there are two modes of requesting data from a database: a read access mode and a write access mode. In most DBMSs a majority of the database requests are in read access mode. These read access mode requests are typically returned by the DBMS much faster, as they involve a small fraction of the processing that write requests require. The write access mode requests have to obtain exclusive access to the objects they modify, and are subject to transaction control.

By separating read access mode operations from write access mode operations, responses to read operations are more expedient since these responses don't have to wait for write operations to complete. A further advantage of the separation by request type (such as the operation mode) is that the database that receives the operations over a connection receives the data sequentially, sorted by type. Accordingly the operations are pooled and assigned to connections in a series.

The pooling of the operations provides an opportunity to more efficiently control database connections. Controlling database connections involves creating and taking down database connections, in accordance with predefined criteria. In particular, as there are typically more read than write access mode operations, it is advantageous to ensure that one read type connection is available for as long as there are database requests being received by clients. This ensures that a connection exists when an operation is received.

According to an aspect of the present invention, there is provided a method for directing a server to send database queries to a database management system configured to manage a database. This method comprises receiving a database request, parsing the database request into operation requests for performing operations on the database, grouping together operation requests of a particular type, and forwarding operation requests of a particular type over an associated connection to the database.

According to another aspect of the present invention, there is provided a computer program product having a computer-readable medium tangibly embodying computer executable code for directing a server to send database queries to a database management system configured to manage a database. The computer program product comprises code for receiving a database request, code for parsing the database request into operation requests for performing operations on the database, code for grouping together operation requests of a particular type, and code for forwarding operation requests of a particular type over an associated connection to the database.

According to yet another aspect of the present invention, there is provided a server for sending database queries to a database management system configured to manage a database. The server comprises means for receiving a database request, means for parsing the database request into operation requests for performing operations on the database, means for grouping together operation requests of a particular type, and means for forwarding operation requests of a particular type over an associated connection to the database.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following detailed description of the embodiments of the present invention is not intended to limit the implementation of the invention to any particular computer programming language. The present invention may be implemented in any computer programming language provided that the OS (Operating System) provides the facilities that may support the requirements of the present invention. A preferred embodiment is implemented in the C or C++ computer programming language (or other computer programming languages in conjunction with C/C++). Any limitations presented would be a result of a particular type of operating system, computer programming language, or data processing system and would not be a limitation of the present invention.

The invention provides a method for connection control, a method for processing a request, and a system for processing a resource request that improve connection usage between an application server and a digital resource storage and retrieval system, such as a database. The invention reduces the number of connections between the application server and the digital resource storage and retrieval system, thereby reducing the volume of connection control processing and signaling. The invention also provides for the serialized and sorted delivery of requests to the digital resource storage and retrieval system to reduce the amount of processing demanded of the digital resource storage and retrieval system.

Figure 1:
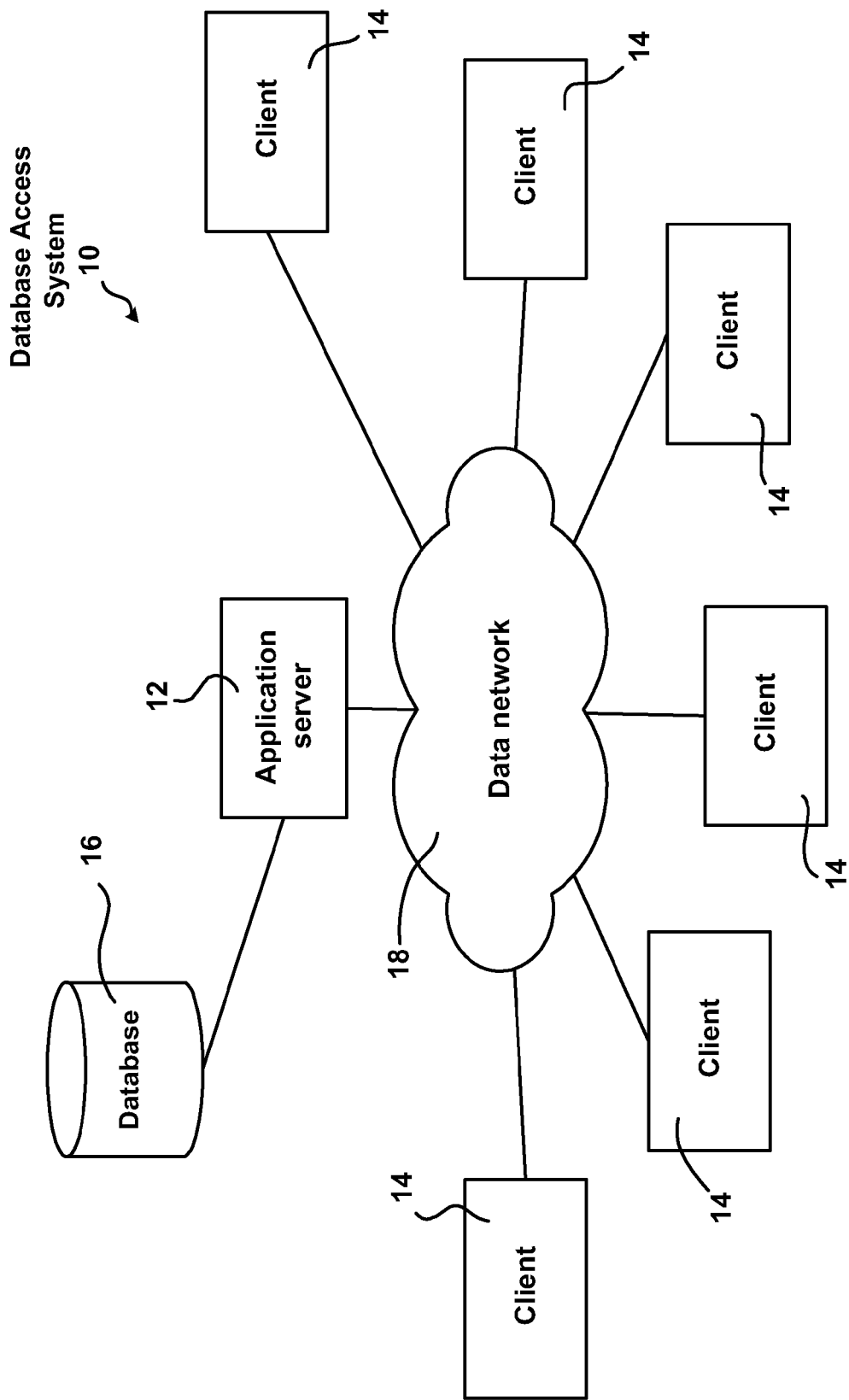
FIG. 1 is a schematic diagram of a typical database access system in which an application server of the present invention can be used.

FIG. 1 schematically illustrates a typical database access system 10 for accessing a digital resource storage and retrieval system. The database access system 10 comprises an application server 12 that provides a plurality of clients 14 with access to a database 16. Typically, the clients 14 are workstations or stand-alone computers running software application programs that use available programming interfaces and other operating system and software provided functionality to connect to the application server 12, which exchanges data with the database 16. A data network 18 interconnects the clients 14 with the application server 12. The connection between the application server 12 and database 16 (i.e. the back-end connection) is not part of the data network 18.

Figure 2:
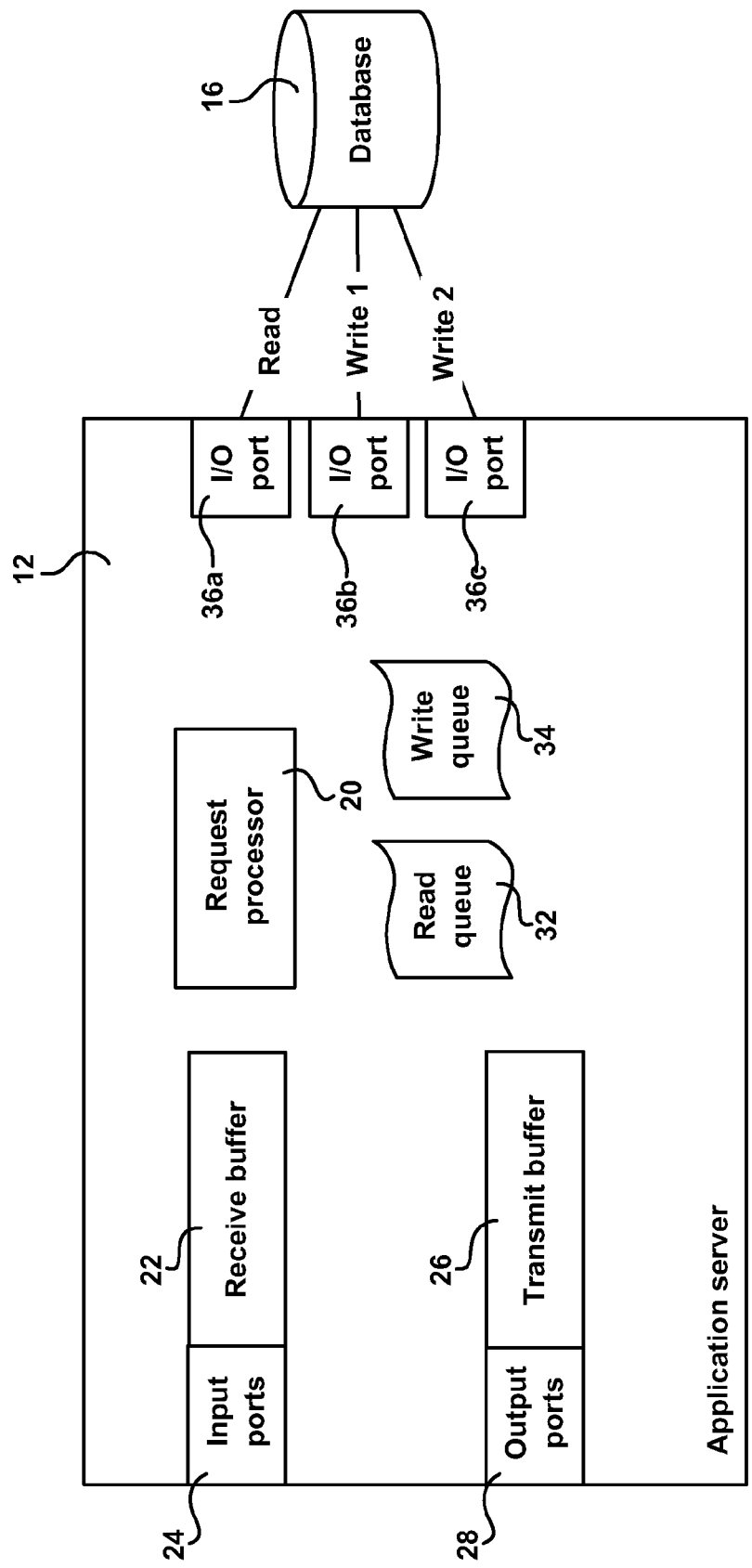
FIG. 2 is a schematic block diagram illustrating principal components of an application server in accordance with the present invention of FIG. 1.

FIG. 2 schematically illustrates principal functional blocks of a resource processor of the application server 12, in accordance with an exemplary embodiment of the invention. The resource processor functionality of application server 12 comprises a request processor 20 that is adapted to process requests from the clients 14 that are written to a receive buffer 22, from one of a plurality of logical input ports 24. The application server 12 also comprises a transmit buffer 26 and a plurality of logical output ports 28 through which replies to respective requests are returned to the respective clients 14. The request processor 20 has a parser for inspecting requests and identifying operations to be applied at the database 16, and logic for determining whether these operations need to be run under transaction control. The request processor 20 further performs queue management. The request processor 20 may further perform access control, and other implementation specific operations as required, in a manner well known in the art.

To understand the request processing operation of the application server 12 in greater detail, an exemplary structure for database requests, and how they are applied at a database 16 is described. Database requests (for example queries) may comprise a plurality of operations usually called statements, or sentences of a predefined query language, such as a structured query language (SQL). Compound database requests require a plurality of database connections to database 16. Each of the database requests specifies one or more operations. Each operation applies to a single database object (a page, a table, a row, a field, a character, etc.). A database object is a modifiable unit of a database 16. A page is the finest unit of the digital information that is independently retrievable from storage at the database 16.

The processing that an operation performs on an object depends on the keywords and terms of the operation. These operations can usually be classified into two kinds: those that run under transaction control and those that do not. In principle it is possible for a database controller to concurrently handle a plurality of different modes for applying the operations, and these modes could be handled with a straightforward application of the present embodiment. The separation of requests into operations respects atomicity of the operations, so that if one operation cannot be committed or aborted unless a second operation is committed or aborted (due to potential inconsistency of database 16), the two operations are together performed under transaction control.

Operations that run under transaction control are applied using processing controls that provide for documentation of the processing steps performed during the operation (e.g.

annotations to database pages, logging, etc.). The documentation is used during recovery of database 16 when restarting after a failure, as will be well understood by those of ordinary skill in the art. Any operation that requires a change to be made to its database object usually runs under transaction control.

Conversely, operations that do not modify their respective database objects do not require transaction control for most applications. While this general rule is followed by most database systems such as database 16, in some cases, read operations may need to be performed under transaction control. Further, some fields of a database (which do not need to be maintained in a consistent state) may not need to be modified under transaction control. Notwithstanding the possible exceptions, operations that require transaction control are for purposes of illustration and explanation herein termed write operations and those that do not are termed read operations.

Referring again to FIG. 2, the request processor 20 inspects database requests to retrieve the operations and separates the read operations from write operations. The request processor 20 performs queue management for operation queues. More specifically, two queues (read queue 32 and write queue 34) are provided for temporarily storing the operations, until a connection is available. The read queue 32 and write queue 34 each store operations of the designated type that are waiting for transmission over database connections associated with the request type of the queue. Each queue is therefore associated with a respective disjoint set of database connections.

In operation, the request processor 20 places the operations retrieved from the database requests of the client 14 into the appropriate queue, for retrieval and processing when access to the database 16 becomes available. When a read database connection (a logical construct using one of the input/output (I/O) ports 36, in this case 36*a*) becomes available, the request processor 20 identifies the next operation in the read queue 32 and sends the identified operation to the database 16 along the connection. Likewise, when either of write database connection 1 (using I/O port 36*b*) or write database connection 2 (using I/O port 36*c*) becomes available, the next operation in the write queue 34 is forwarded to the database 16.

The I/O ports 36 are identical; however, the request processor 20 will have designated some I/O ports (e.g. 36*a*) as being reserved for read operations and others (e.g. 36*b* and *c*) as being reserved for write operations. The I/O ports 36 may use a different protocol and type (usually called the back-end connection) from those of the input port 24 and output port 28 that are connected to the clients 14 via equipment of the data network 18. If the protocols and types are different, the request processor 20 provides translation or reformatting as required. Further procedures for managing a queue of this kind regarding priority, scheduling, etc. may also be performed by the request processor 20.

The request processor 20 further comprises a connection handler for requesting setup and tear-down of database connections. In accordance with the invention, connections may be created and taken down in a more efficient manner than on a client-connection basis. Generally speaking, the connection handler monitors the queues to determine if predefined criteria are met and sets up or tears down database connections accordingly. The request processor 20 therefore may, depending upon certain criteria, throttle or accelerate the rate at which the operations are sent to the database 16 by adding or removing connections.

The condition may relate to the number of operations in a corresponding queue, or some other traffic metric. For example, if the connection handler determines that an empirically derived threshold (or threshold function) is exceeded in one of the queues, it creates or deletes connections, accordingly. The response rate to the operations and/or the wait time of the objects in queue may also, or alternatively, be monitored to make this determination.

Other rules for governing the creation and deletion of connections of respective types may also be used. For example, database capacity messages may be used to determine if the application server 12 is the cause of a bottleneck in the database access system 10 or whether the database 16 is being flooded. The response time of the database 16 may be used to judge the capacity of the database 16.

Figure 3:
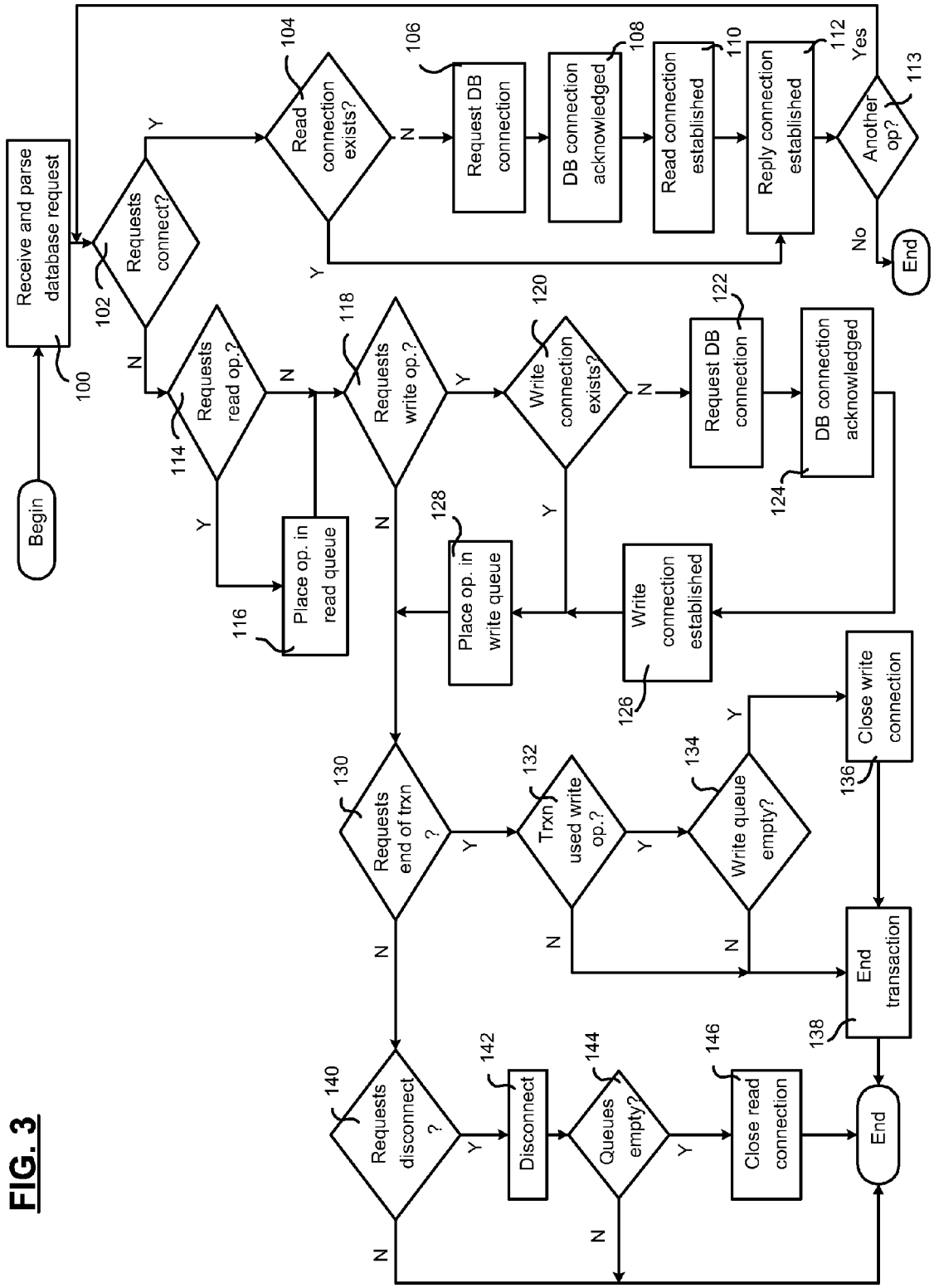
FIG. 3 is a flow chart illustrating principal steps in processing a request from a client at an application server in accordance with the present invention of FIG. 1.

The process flow chart of FIG. 3 schematically illustrates principal steps that may be performed in processing an operation of a request from a client 14 at the application server 12, in accordance with the invention. The process begins, and in block 100, the request is received and parsed to identify the operations contained in the request. All similar operations are considered together. If it is determined in block 102 that one or more of the operations are connection requests, it is determined (in block 104) whether a read connection exists. It is assumed that the majority of operations requested are for read operations.

Therefore, in anticipation of such an operation the procedure verifies that a read connection exists and creates a connection if one does not exist when a connection request is received. This assures that a read connection will have been set up for subsequent read operations, thus imposing a slight performance advantage for read operations, given that read operations are more frequent and less processing intensive than write operations.

The steps in creating the connection involve requesting a database connection (block 106), receiving acknowledgement of the connection request (block 108) and thereafter determining that the read connection is established (block 110). In block 112, once the existence of a read connection is ensured, a reply is sent to the client 14, to indicate that the connection is established. If it is determined in block 113 that no other operations are contained in the request, the process ends when the request is processed. Otherwise the procedure returns to block 102.

If, in block 102 it is determined that the received database request does not comprise any connection request or that these have already been processed, it may be determined (in block 114) that the request comprises at least one read operation. If so, each read operation is placed in a read queue 32 (block 116). If a plurality of operations are extracted from a single request, particularly if a plurality of read connections transport respective operations, care must be taken to ensure that the responses are properly associated to the corresponding operations in a manner known to those skilled in the art. Usually such mechanisms make use of operating systems features and lower level protocol processing. Once the read operation(s) are placed in the read queue 32, the procedure advances to block 118, where it is determined if the database request contains a write operation.

If one or more write operations are identified (in block 118), it must be first determined whether or not a write connection exists (in block 120), as connection requests are treated as requiring a read connection to be created. If it is determined that no write connection exists, one is created in steps 122–126 in a manner similar to that described with respect to the steps for creating a read connection described above with reference to steps 106–110. Once a write connection is determined to exist, the write operation(s) of the request are placed in the write queue 34 (block 128).

If no write operations are contained in the request, or once all of the write operations have been placed in the write connection queue, it is determined (in block 130) if the request contains a signal for the end of a group of operations called a transaction. Transactions may be distributed across a plurality of requests from clients 14. An end transaction request signals the end of the group. In such a case, in accordance with the bias in favor of read connections, any write connections set up to handle the terminated transaction may be eligible to be taken down. Accordingly, in block 132, it is determined if the transaction (to be terminated) used a write operation, and (in block 134) whether the (corresponding) write queue 34 is empty. If either of these is determined to be false, the transaction is ended (block 138), and the processing of the request is complete. If both (steps 132,134) are found true, then the corresponding write connection is taken down (block 136), and the transaction is ended (block 138). Consequently, the processing of the request is ended. On the other hand, the read connection (if established) is allowed to continue to exist.

If none of the previously identified types require further processing (or all operations associated therewith have been placed in respective queues), it is determined (in block 140) whether the request contains a disconnect operation. If it does not, the request may be deemed processed, and the process ends until another request is received. Otherwise, in block 142, the connection is taken down. If both the read and write queues are empty (as determined in block 144) the read connection is taken down (in block 146). Presumably, any write queues will have been terminated upon completion of a transaction. Otherwise there are other connections to client 14 open, and the read connection is not taken down.

It will be appreciated by those skilled in the art that steps of determining if a queue is empty (134,144) may comprise applying a test of the read and write connections, respective protocol buffers, or control information to determine if a request is being sent or waiting to be sent. Such a test may be applied only once the database 16 has responded to any pending operations retrieved from the database request.

While the invention has thus far been described with reference to a database system, the invention may be applied in a broader set of environments. Substantially any application server 12 that receives requests for a resource and supports connections to a source (i.e. a digital resource storage and retrieval system) for each of the requests can be improved by concentrating the requests onto fewer connections, and by so doing, serially providing the requests to the source. If there are different types of requests that are handled differently by the source, associated with different modes for requesting the resources, the application server 12 may sort the requests according to type.

Once the requests are sorted by type, the application server 12 may issue the requests over connections associated with respective ones of the request types. Examples of the request modes comprise the previously described transaction control and its alternative, in relation to a database type of source. In other embodiments, different protocols or sets of applications associated with receiving and/or processing the requests may have priority, time sensitivity, history of client 14, or any other application-related feature that impacts how the request is handled by the source or may be associated with a respective mode.

Accordingly, the invention may have application to object request brokering systems, differentiated web services deployment, and to systems that manage requests for a service, processor capacity, data, or other managed resources that are received at an application layer or server, and require differentiated handling of the requests at the source. If requests are arriving at the source too quickly or too slowly, the number of connections can also be increased/decreased accordingly.

Figure 4:
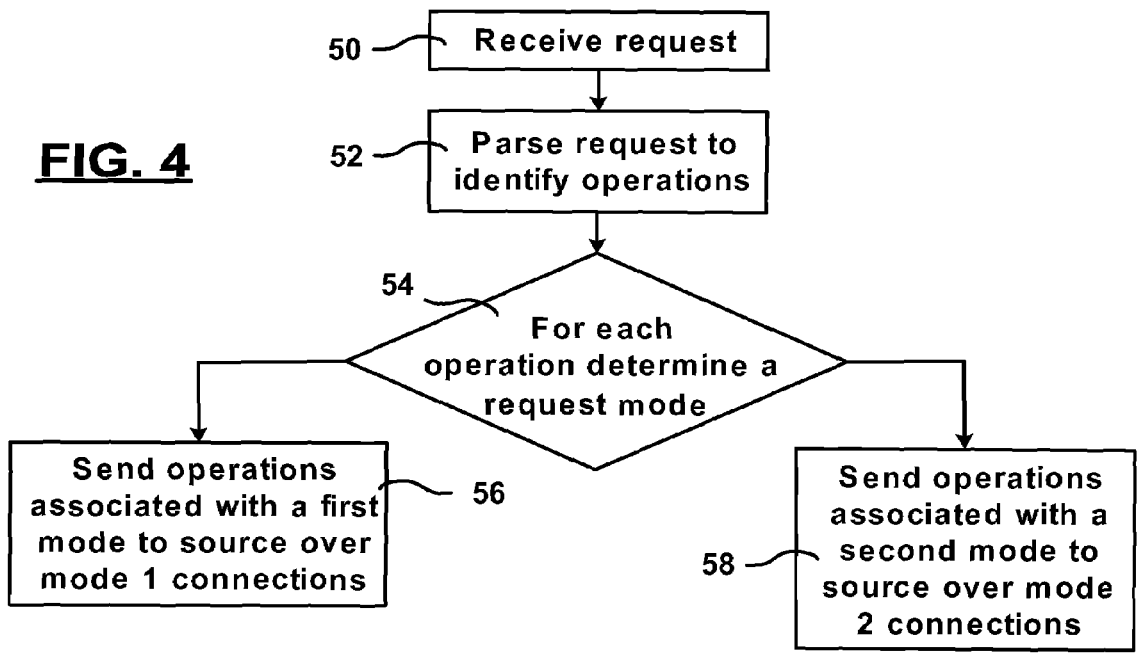
FIG. 4 is a flow chart illustrating principal steps involved in a method processing resource requests in accordance with the present invention of FIG. 1.

FIG. 4 is a flow chart schematically illustrating principal steps involved in a method of request processing at an application server 12, in accordance with the invention. The method involves receiving a request from a client 14 (block 50), and parsing the request to identify any separate operations contained therein (block 52). In accordance with the illustrated embodiment the requests are parsed to potentially extract a plurality of operations, depending on the specific request received. Each of the operations is further assumed to be one of a first mode and a second mode of requesting resources from the source.

Once the operations are identified, they are inspected (block 54) to determine which mode of requesting is associated with each operation. The number of modes may be other than two, however only two are illustrated. Operations associated with the first mode are issued (block 56) over mode 1 connections. As was the case in the database embodiment, the operations may be queued, subjected to access control procedures, and/or translated prior to being sent to the source. The operation may further be preprocessed and/or sorted in accordance with known techniques for handling requests. The operations associated with the second mode of requesting are sent over mode 2 connections (block 58).

Figure 5:
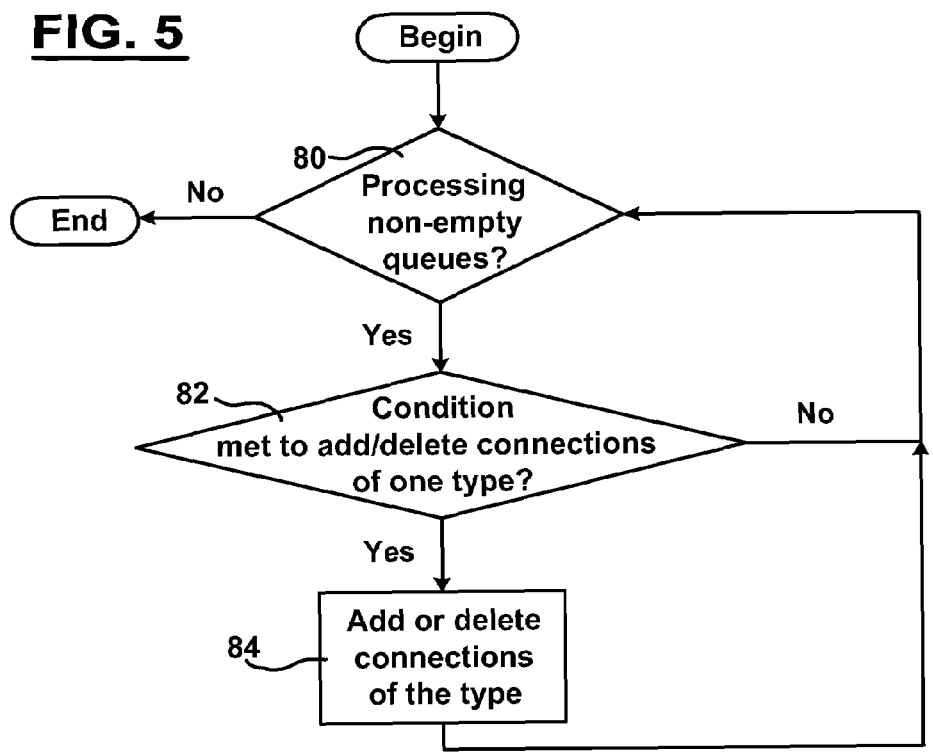
FIG. 5 is a flow chart illustrating principal steps involved in a method of controlling database connections in accordance with the present invention of FIG. 1.

FIG. 5 schematically illustrates principal steps in a connection control process that may be used in accordance with the invention to control a flow of requests through the application server 12 that employs a technique for queuing the requests. The control process begins, and in block 80 it is determined whether the queues are empty and whether there are any connections to client 14 through the application server 12 to the source. If the request processing is halted, or there are no connections and empty queues, the control process has no function and so the procedure ends.

If it is determined (at bock 80) that the request processing is on-going, then with some predefined frequency, or in response to a predetermined event, a test is applied to determine if a condition is met for adding or deleting connections of one of the predefined types (block 82). As previously explained, the condition can be defined in terms, for example, of the rate at which requests, or operations, are received, the rate of completion of requests at the application server 12, the volume in an associated queue, or the time taken by the source to respond to an operation. The condition therefore can be determined without requiring explicit feedback from the source.

Alternatively, recourse to the source may be useful in determining whether to increase or decrease the rate of requests. If the condition is determined not to be met, the control process returns to block 80, otherwise, in block 84, the addition or deletion of a selected connection of the identified type is effected. Once the addition or deletion is complete, the control process returns to block 80.

This control process allows for modifying the number of connections to the source in a flexible manner, with reduced connection signaling and processing overhead. In the illustrated embodiment, the control process is separated from the request processing operations. Alternatively, FIG. 5 shows one method by which that the control process can be integrated with the request processing functions at an application server 12.

The invention therefore has been described with reference to a system and a method for controlling connections between a source and an application server function. The method enables fewer connections between the source and application server 12 than a number of connections of client 14 to the application server 12. The reduction in connections results in less connection control processing and signaling. The efficiency of supplying the source with request operations in a format that is sorted by type also provides for more efficient handling of the operations. Further still, the operations are supplied at a rate that is convenient for the source, improving efficiency at the source.

The present invention can be implemented in digital electronic circuitry, or in computer hardware, firmware, software, or in any combination thereof. Apparatus of the invention can be implemented in the computer program product tangibly embodied in a machine-readable storage device for execution by a programmable system. Methods/actions can be performed by a programmable processor executing a programmer's instructions to perform functions of the invention by operating on input data and generating output. The invention can be implemented advantageously in one or more computer programs that are executable on a programmable system including at least one input device, and at least one output device. Each computer program can be implemented in a high-level procedural or object-oriented programming language, or in assembly or machine language if desired. In any case, the language can be a compiled or an interpreted language.

Suitable processors comprise, by way or example, both general and specific micro-processors. Generally, a processor will receive instructions and data from a read-only memory and/or a random access memory. Generally, a computer will comprise one or more mass storage devices for storing data files; such devices comprise magnetic disks, such as internal hard disks and removable disks; magneto-optical disks; and optical disks. Storage devices suitable for tangibly embodying computer program instructions and data comprise all forms of non-volatile memory, including by way of example semi-conductor memory devices such as EPROM, EEPROM, and flash memory devices; magnetic disks such as internal hard disks and removable disks; magneto-optical disks; and CD-ROM and DVD disks. Any of the foregoing can be supplemented by, or incorporated in, ASICs application-specific integrated circuits.

Programmable processing systems contained in the resource processor shown in FIG. 2 and the application servers 12 shown in FIG. 1 are suitable for implementing or performing the apparatus or methods of the invention. The system may comprise a processor, a random access memory, a hard drive controller and an input/output controller coupled by a processor bus.

It will be apparent to those skilled in this art that various modifications and variations may be made to the embodiments disclosed herein, consistent with the present invention, without departing from the spirit and scope of the present invention.

For example, the data network 18 may be a public Internet, and in some embodiments it may be a private intranet, or it may be a combination of the two. Further, the data network 18 may be of any known configuration or type that provides for the communication of data. The data network 18 may further comprise gateway servers, and the application server 12 may serve a plurality of databases 16 and other back end systems. Furthermore, in other embodiments, the application server 12, client 14 and database 16 may all be instantiated on one or more processors or processor systems requiring no data network 18.

An operating system associated with the request processor 20 handles exchange of request and response messages, assignment of ports to handle connections to data network 18, and other lower level communications functions. Depending on the embodiment of the invention, the operating system may take on more or less of the responsibility for connection configuration and control. Thus, while the request processor 20 may be embodied as a software application that comprises the connection handler, which requests the addition and removal of the database connections using lower level service primitives, the connection handler may be embodied by lower level processing, or a combination of both.

While two queues have been illustrated in FIG. 2, one queue, a plurality of queues each associated with a priority value, a priority value and a connection type, or a specific connection, can be used in other embodiments. If each of a plurality of read and write database connections is associated with a respective read queue 32 or write queue 34, the assembling of responses from database 16 to formulate response messages to be sent to clients 14 may be somewhat simplified. However, having only one read queue 32 and one write queue 34 regardless of the number of read and write database connections simplifies the addition and deletion of connections and more evenly distributes delay among the operations. Other relationships between queues and connections may be suggested by hardware limitations or by traffic and service requirements or otherwise suggested for use in particular embodiments.

In FIG. 3, the receipt of a connection request in block 102 led to the assurance of the existence of a read queue 32. The assurance may be relied upon by a connection handler to predict imminent usage and to create connections to handle the predicted demand. In other embodiments assurance of both read and write connections may be performed, especially if a time to setup a connection is substantial. Alternatively, the connection types assured may depend on a type, or a history of the client, for example. Furthermore, in some embodiments no connection is created until a read or write request is received. The procedures for controlling the connections is preferably optimized to permit a highest usage with a minimum of underutilized capacity.

It is to be understood that the specific embodiments of the invention that have been described are merely illustrative of certain application of the principle of the present invention. Numerous modifications may be made to the system and method for accessing resources in a database invention described herein without departing from the spirit and scope of the present invention.

What is claimed is:

1. A computer-implemented method for directing a server to send a database query to a database management system that manages a database, the method comprising:

receiving a database request;

parsing the database request into a plurality of operation requests for performing operations on the database;

separately grouping the operation requests into at least a first group and a second group, wherein the first group contains a sequence of serial operations of a first particular type, and wherein the second group contains a sequence of serial operations of a second particular type that is distinct from the first particular type;

wherein the first group includes read operations;

wherein the second group includes write operations, so that responses to the read operations do not await the completion of the write operations;

establishing a dedicated first connection for the operations of the first group;

establishing a dedicated second connection for the operations of the second group;

forwarding the operation requests of the first group over the first connection to the database;

maintaining and reusing the first connection until all the operations of the first group have been forwarded to the database;

forwarding the operation requests of the second group over the second connection to the database; and maintaining and reusing the second connection until all the operations of the second group have been forwarded to the database, sequentially, sorted by type, so that the read operations are pooled in series and assigned to the first connection, and the write operations are pooled in series and assigned to the second connection.

2. The method of claim 1, further comprising taking down the first connection upon exhaustion of all the operations of the first group.

3. The method of claim 1, further comprising taking down the second connection upon exhaustion of all the operations of the second group.

4. The method of claim 2, wherein taking down the first connection comprises taking down the first connection if there are insufficient operation requests of the first group in a queue associated with the operation requests.

5. The method of claim 3, wherein taking down the second connection comprises taking down the second connection if there are insufficient operation requests of the second group in a queue associated with the operation requests.

6. A computer program product having instruction codes stored on a computer-usable medium, for directing a server to send a database query to a database management system that manages a database, the computer program product comprising:

a set of instruction codes for receiving a database request;

a set of instruction codes for parsing the database request into a plurality of operation requests for performing operations on the database;

a set of instruction codes for separately grouping the operation requests into at least a first group and a second group, wherein the first group contains a sequence of serial operations of a first particular type, and wherein the second group contains a sequence of serial operations of a second particular type that is distinct from the first particular type;

wherein the first group includes read operations;

wherein the second group includes write operations, so that responses to the read operations do not await the completion of the write operations;

a set of instruction codes for establishing a dedicated first connection for the operations of the first group;

a set of instruction codes for establishing a dedicated second connection for the operations of the second group;

a set of instruction codes for forwarding the operation requests of the first group over the first connection to the database;

a set of instruction codes for maintaining and reusing the first connection until all the operations of the first group have been forwarded to the database;

a set of instruction codes for forwarding the operation requests of the second group over the second connection to the database; and a set of instruction codes for maintaining and reusing the second connection until all the operations of the second group have been forwarded to the database, sequentially, sorted by type, so that the read operations are pooled in series and assigned to the first connection, and the write operations are pooled in series and assigned to the second connection.

7. The computer program product of claim 6, further comprising a set of instruction codes for taking down the first connection upon exhaustion of all the operations of the first group.

8. The computer program product of claim 6, further comprising a set of instruction codes for taking down the second connection upon exhaustion of all the operations of the second group.

9. The computer program product of claim 7, wherein the set of instruction codes takes down the first connection if there are insufficient operation requests of the first group in a queue associated with the operation requests.

10. The computer program product of claim 8, wherein the set of instruction codes takes down the second connection if there are insufficient operation requests of the second group in a queue associated with the operation requests.

11. A computer-implemented database management system for directing a server to send a database query to a database management system that manages a database, the database management system comprising:

means for receiving a database request;

means for parsing the database request into a plurality of operation requests for performing operations on the database;

means for separately grouping the operation requests into at least a first group and a second group, wherein the first group contains a sequence of serial operations of a first particular type, and wherein the second group contains a sequence of serial operations of a second particular type that is distinct from the first particular type;

wherein the first group includes read operations;

wherein the second group includes write operations, so that responses to the read operations do not await the completion of the write operations;

establishing a dedicated first connection for the operations of the first group;

establishing a dedicated second connection for the operations of the second group;

forwarding the operation requests of the first group over the first connection to the database;

maintaining and reusing the first connection until all the operations of the first group have been forwarded to the database;

forwarding the operation requests of the second group over the second connection to the database; and maintaining and reusing the second connection until all the operations of the second group have been forwarded to the database, sequentially, sorted by type, so that the read operations are pooled in series and assigned to the first connection, and the write operations are pooled in series and assigned to the second connection.

12. The database management system of claim 11, further means for comprising taking down the first connection upon exhaustion of all the operations of the first group.

13. The database management system of claim 12, wherein the means for setting up and taking down the associated connections favor operation requests of a first type over operation requests of a second type further comprising, means for taking down the second connection upon exhaustion of all the operations of the second group.

14. The database management system of claim 12, wherein the means for taking down the first connection takes down the first connection if there are insufficient operation requests of the first group in a queue associated with the operation requests.

15. The database management system of claim 13, wherein the means for taking down the second connection takes down the second connection if there are insufficient operation requests of the first group in a queue associated with the operation requests.

\* \* \* \* \*